(12) United States Patent
Liu

(10) Patent No.: US 11,126,643 B2
(45) Date of Patent: Sep. 21, 2021

(54) INTELLIGENT ADVERTISEMENT PUBLISHING SYSTEM AND METHOD BASED ON DOUBLE-SIDED PRINTER DISTRIBUTION MAP

(71) Applicant: Guangzhou Zonerich Business Machine Co. Ltd., Guangzhou (CN)

(72) Inventor: Liqiang Liu, Guangzhou (CN)

(73) Assignee: GUANGZHOU ZONERICH BUSINESS MACHINE CO., LTD., Guangzhou (CN)

( * ) Notice: Subject to any disclaimer, the term of this patent is extended or adjusted under 35 U.S.C. 154(b) by 107 days.

(21) Appl. No.: 16/746,013

(22) Filed: Jan. 17, 2020

(65) Prior Publication Data

US 2020/0151203 A1    May 14, 2020

Related U.S. Application Data

(63) Continuation of application No. PCT/CN2017/098567, filed on Aug. 23, 2017.

(30) Foreign Application Priority Data

Jul. 18, 2017    (CN) .......................... 201710585855.9

(51) Int. Cl.
  *G06Q 30/02*    (2012.01)
  *G06F 16/29*    (2019.01)
  (Continued)

(52) U.S. Cl.
  CPC .......... *G06F 16/29* (2019.01); *G03G 15/231* (2013.01); *G06Q 30/0276* (2013.01);
  (Continued)

(58) Field of Classification Search
  CPC .................................................. G06Q 30/02
  See application file for complete search history.

(56) References Cited

U.S. PATENT DOCUMENTS 8,970,898 B2 * 3/2015 Yamashita ......... H04N 1/00968
                                                 358/1.2
10,909,361 B2 * 2/2021 Yoshino ............. G06K 9/00469
(Continued)

FOREIGN PATENT DOCUMENTS

CN       1365477 A    8/2002
CN     102622701 A    8/2012
(Continued)

OTHER PUBLICATIONS

John Mathai; Gobi Ramasamy; Sathya Purusothaman; Kirubakaran Ezra, Location based mobile advertising framework for communters (English), 2015 Internation Conference on Computing and Network Communications (CoCoNet) (pp. 928-935), Dec. 1, 2015 (Year: 2015).*

(Continued)

*Primary Examiner* — Marilyn G Macasiano
(74) *Attorney, Agent, or Firm* — Myers Wolin, LLC

(57) ABSTRACT

An intelligent advertisement publishing system and method based on a double-sided printer distribution map. The method includes: generating a distribution map based on geographical location information of double-sided printers; displaying the distribution map of the double-sided printers, and after obtaining advertisement content input by a user and an advertisement publishing scope selected by the user on the distribution map, generating advertisement information; parsing to obtain the corresponding advertisement publishing scope and advertisement content, generating corresponding advertisement push information based on the advertisement content, and sending the advertisement push information to double-sided printers in the advertisement publishing scope; and enabling the double-sided printers to print the corresponding advertisement information at the
(Continued)

S1 Generate a distribution map based on geographical location information of duplex printers by means of a cloud advertisement server, and send the distribution map to an advertisement publishing terminal S2 Display the distribution map of the duplex printers by means of the advertisement publishing terminal, and after obtaining advertisement content input by a user and an advertisement publishing scope selected by the user on the distribution map, generate advertisement information and send the advertisement information to the cloud advertisement server S3 After receiving, by means of the cloud advertisement server, the advertisement information sent by the advertisement publishing terminal, perform parsing to obtain the corresponding advertisement publishing scope and advertisement content, generate corresponding advertisement push information based on the advertisement content, and send the advertisement push information to duplex printers in the advertisement publishing scope S4 Parse the advertisement push information after the duplex printers receive the advertisement push information, and print the corresponding advertisement information on the back of cash register paper when printing cash registration information back of cash register paper when printing cash registration information.

10 Claims, 1 Drawing Sheet

(51) Int. Cl.
*G03G 15/23* (2006.01)
*G07G 1/00* (2006.01)
*H04L 29/08* (2006.01)

(52) U.S. Cl.
CPC ........... *G07G 1/0018* (2013.01); *H04L 67/18* (2013.01); *H04L 67/26* (2013.01)

(56) References Cited

U.S. PATENT DOCUMENTS

| | | | |
|---|---|---|---|
| 2007/0125843 A1* | 6/2007 | Byerly | G06F 3/1206 235/380 |
| 2012/0127501 A1* | 5/2012 | Kobayashi | G06K 15/1868 358/1.13 |
| 2013/0112744 A1 | 5/2013 | Landers | |
| 2014/0325028 A1* | 10/2014 | Jiang | H04L 67/18 709/219 |
| 2015/0186941 A1 | 7/2015 | Anthony et al. | |

FOREIGN PATENT DOCUMENTS

| | | |
|---|---|---|
| CN | 103310355 A | 9/2013 |
| CN | 103984680 A | 8/2014 |
| CN | 104662572 A | 5/2015 |
| CN | 106097021 A | 11/2016 |
| CN | 106097214 A | 11/2016 |
| JP | 2002366831 A | 12/2002 |
| JP | 2004213182 A | 7/2004 |
| WO | WO 2011/008416 A1 * 1/2011 | ............. G06Q 30/00 |

OTHER PUBLICATIONS

International Search Report issued by the International Searching Authority for corresponding International Patent Application No. PCT/CN2017/098567, dated Apr. 24, 2018, with English translation attached.

Written Opinion issued by the International Searching Authority for corresponding International Patent Application No. PCT/CN2017/098567, dated Apr. 24, 2018, with English Translation attached.

First Office Action issued by the China National Intellectual Property Administration for corresponding Chinese Patent Application No. 2017105858559, dated Jun. 11, 2019, with English translation attached.

Second Office Action issued by the China National Intellectual Property Administration for corresponding Chinese Patent Application No. 2017105858559, dated Mar. 1, 2020, with English translation attached.

* cited by examiner

INTELLIGENT ADVERTISEMENT PUBLISHING SYSTEM AND METHOD BASED ON DOUBLE-SIDED PRINTER DISTRIBUTION MAP

CROSS REFERENCE TO RELATED APPLICATIONS

This application is a continuation of International Application No. PCT/CN2017/098567, filed on Aug. 23, 2017, which takes priority from Chinese Patent Application No. 201710585855.9, filed on Jul. 18, 2017, the contents of each of which are incorporated by reference herein.

TECHNICAL FIELD

The present disclosure relates to the field of information processing, and in particular, to an intelligent advertisement publishing system and method based on a double-sided printer distribution map.

BACKGROUND

At present, the back of cash register paper is generally blank. If advertisements need to be printed on the back of the cash register paper, according to the existing technology, the advertisements are printed on the back of the cash register paper in advance after advertisement content is customized by advertisers, and then the cash register paper is put into use at a checkout counter. In this way, it needs to collect the advertisement content in advance, and also needs to carry out a plurality of steps such as transportation, printing, and cash register paper distribution. When a certain area needs to be selected for advertisement publishing, the area further needs to be manually selected before advertisement publishing, which consumes many manpower and material resources and need a relatively long time period. In addition, the advertisement content printed in this method is fixed and cannot be changed after being printed on the back of the cash register paper. This easily causes invalid advertisements, junk advertisements, and the like. The timeliness of the advertisement information is poor, and the advertisement information cannot be updated in time or published as soon as possible.

SUMMARY

To resolve the foregoing technical problems, the present disclosure provides an intelligent advertisement publishing system based on a double-sided printer distribution map; and further provides an intelligent advertisement publishing method based on a double-sided printer distribution map.

To resolve the technical problems, the present disclosure adopts the following technical solution:

an intelligent advertisement publishing system based on a double-sided printer distribution map, including a cloud advertisement server, at least one advertisement publishing terminal, and a plurality of double-sided printers, where the cloud advertisement server is separately and wirelessly connected to the advertisement publishing terminal and the double-sided printers; the cloud advertisement server is configured to generate a distribution map based on geographical location information of the double-sided printers, and send the distribution map to the advertisement publishing terminal;

the advertisement publishing terminal is configured to display the distribution map of the double-sided printers, and after obtaining advertisement content input by a user and an advertisement publishing scope selected by the user on the distribution map, generate advertisement information and send the advertisement information to the cloud advertisement server;

the cloud advertisement server is further configured to parse, after receiving the advertisement information sent by the advertisement publishing terminal, the advertisement information to obtain the corresponding advertisement publishing scope and advertisement content, generate corresponding advertisement push information based on the advertisement content, and send the advertisement push information to double-sided printers in the advertisement publishing scope; and each double-sided printer is configured to receive the advertisement push information and print the corresponding advertisement information on the back of cash register paper when printing cash register information.

Further, the plurality of double-sided printers are divided into a plurality of specified categories in advance. The step of obtaining an advertisement publishing scope selected by the user on the distribution map further includes selecting double-sided printers of a specified category input by the user based on the corresponding category.

Further, the specified categories refer to a plurality of categories obtained by obtaining historical printed data of a plurality of double-sided printers within a period of time, performing data cleansing, and further performing clustering and grouping based on commodity information in the historical printed data.

To resolve the technical problems, the present disclosure adopts another technical solution:

an intelligent advertisement publishing method based on a double-sided printer distribution map, including steps of:

generating, through a cloud advertisement server, a distribution map based on geographical location information of double-sided printers, and sending the distribution map to an advertisement publishing terminal;

displaying, through the advertisement publishing terminal, the distribution map of the double-sided printers, and after obtaining advertisement content input by a user and an advertisement publishing scope selected by the user on the distribution map, generating advertisement information and sending the advertisement information to the cloud advertisement server;

after receiving, through the cloud advertisement server, the advertisement information sent by the advertisement publishing terminal, performing parsing to obtain the corresponding advertisement publishing scope and advertisement content, generating corresponding advertisement push information based on the advertisement content, and sending the advertisement push information to double-sided printers in the advertisement publishing scope; and enabling the double-sided printers to receive and parse the advertisement push information, and print the corresponding advertisement information on the back of cash register paper when printing cash registration information.

Further, the advertisement publishing terminal uses the following method to obtain the advertisement publishing scope selected by the user on the distribution map:

displaying positions of the double-sided printers on the distribution map and dividing the double-sided printers by area, and in response to an area selected by the user, obtaining all double-sided printers in the area as the advertisement publishing scope selected by the user.

Further, the advertisement publishing terminal uses the following method to obtain the advertisement publishing scope selected by the user on the distribution map:

displaying positions of the double-sided printers on the distribution map and obtaining a specified geographical location selected by the user and a distance range and a quantity of double-sided printers that are input by the user, and then performing a radial search within the corresponding distance range with the selected specified geographical location as a center, to select the corresponding quantity of double-sided printers as the advertisement publishing scope selected by the user.

Further, the step of performing a radial search within the corresponding distance range with the selected specified geographical location as a center, to select the corresponding quantity of double-sided printers specifically includes:

taking the selected specified geographical location as the center, gradually increasing a search radius within the corresponding distance range based on a preset search step, performing the radial search from inside out, and sequentially obtaining double-sided printers within a range of the search radius and counting the double-sided printers until the corresponding quantity of double-sided printers are obtained.

Further, the plurality of double-sided printers are divided into a plurality of specified categories in advance, and the step of obtaining an advertisement publishing scope selected by the user on the distribution map further includes selecting double-sided printers of a specified category input by the user based on the corresponding category.

Further, the step of generating, through a cloud advertisement server, a distribution map based on geographical location information of double-sided printers specifically includes:

obtaining, through the cloud advertisement server, geographical location information of all double-sided printers, converting the geographical location information of the double-sided printers into corresponding distribution points on the map, and finally obtaining the distribution map of all the double-sided printers; where the distribution points are configured to be capable of displaying, after being clicked, the geographical location information of the corresponding double-sided printers and corresponding merchant information.

Further, the step of enabling the double-sided printers to receive and parse the advertisement push information, and print the corresponding advertisement information on the back of cash register paper when printing cash registration information includes:

receiving and parsing, through each double-sided printer, the advertisement push information, and generating advertisement information in a corresponding format based on dimensions of the cash register paper; and printing the corresponding advertisement information on the back of the cash register paper in real time when printing cash register information.

Further, the step of printing the corresponding advertisement information on the back of the cash register paper in real time when printing cash register information includes:

calculating the dimensions of the cash register paper occupied by the to-be-printed cash register information after obtaining the to-be-printed cash register information;

calculating a quantity of pieces of printable advertisement information based on the calculated dimensions of the cash register paper occupied by the cash register information;

obtaining one or more pieces of corresponding to-be-printed advertisement information with reference to the calculated quantity; and printing the corresponding advertisement information on the back of the cash register paper in real time when printing the cash register information, until the printing is completed.

The present disclosure has the following beneficial effects that the intelligent advertisement publishing system based on a double-sided printer distribution map according to the present disclosure includes a cloud advertisement server, at least one advertisement publishing terminal, and a plurality of double-sided printers, where the cloud advertisement server is separately and wirelessly connected to the advertisement publishing terminal and the double-sided printers; the cloud advertisement server is configured to generate a distribution map based on geographical location information of the double-sided printers, and send the distribution map to the advertisement publishing terminal; the advertisement publishing terminal is configured to display the distribution map of the double-sided printers, and after obtaining advertisement content input by a user and an advertisement publishing scope selected by the user on the distribution map, generate advertisement information and send the advertisement information to the cloud advertisement server; the cloud advertisement server is further configured to parse, after receiving the advertisement information sent by the advertisement publishing terminal, the advertisement information to obtain the corresponding advertisement publishing scope and advertisement content, generate corresponding advertisement push information based on the advertisement content, and send the advertisement push information to double-sided printers in the advertisement publishing scope; and each double-sided printer is configured to receive the advertisement push information and print the corresponding advertisement information on the back of cash register paper when printing cash register information. According to this system, the advertisement publishing scope can be selected based on the distribution map, the to-be-sent advertisement information can be sent in time to the double-sided printers in the scope selected by the user for printing, and various types of advertisement information can be printed with no need to consume a large quantity of manpower and material resources in advance for printing, which is environmentally friendly. Moreover, the advertisement information can be updated or published at any time. The system is high in timeliness, and can meet the requirements for advertisement information push.

The present disclosure has other beneficial effects that the intelligent advertisement publishing method based on a double-sided printer distribution map includes: generating, through a cloud advertisement server, a distribution map based on geographical location information of double-sided printers, and sending the distribution map to an advertisement publishing terminal; displaying, through the advertisement publishing terminal, the distribution map of the double-sided printers, and after obtaining advertisement content input by a user and an advertisement publishing scope selected by the user on the distribution map, generating advertisement information and sending the advertisement information to the cloud advertisement server; after receiving, through the cloud advertisement server, the advertisement information sent by the advertisement publishing terminal, performing parsing to obtain the corresponding advertisement publishing scope and advertisement content, generating corresponding advertisement push information based on the advertisement content, and sending the advertisement push information to double-sided printers in the advertisement publishing scope; and enabling the double-sided printers to receive and parse the advertisement push information, and print the corresponding advertisement information on the back of cash register paper when printing cash registration information. According to the method, the advertisement publishing scope can be selected based on the distribution map, the to-be-sent advertisement information can be sent in time to the double-sided printers in the scope selected by the user for printing, and various types of advertisement information can be printed with no need to consume a large quantity of manpower and material resources in advance for printing, which is environmentally friendly. Moreover, the advertisement information can be updated or published at any time. The method is high in timeliness, and can meet the requirements for advertisement information push.

BRIEF DESCRIPTION OF THE DRAWINGS

The present disclosure is further described below with reference to accompanying drawings and embodiments.

DETAILED DESCRIPTION

Figure 1:
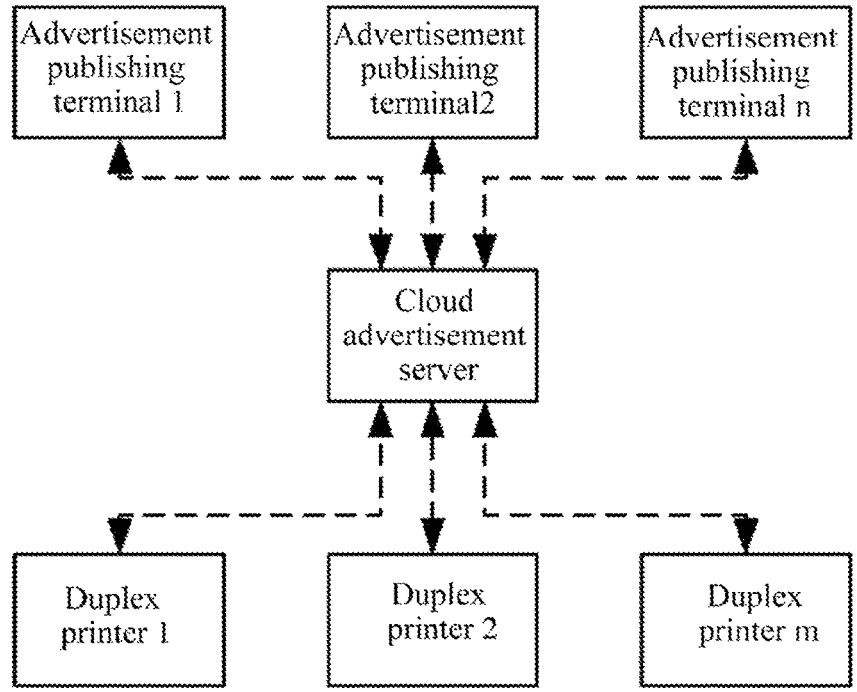
FIG. 1 shows a structural block diagram of a system for advertising through the back of cash register paper according to the present disclosure.

Referring to FIG. 1, the present disclosure provides an intelligent advertisement publishing system based on a double-sided printer distribution map, including a cloud advertisement server, at least one advertisement publishing terminal, and a plurality of double-sided printers, where the cloud advertisement server is separately and wirelessly connected to the advertisement publishing terminal and the double-sided printers; and the cloud advertisement server is configured to generate a distribution map based on geographical location information of the double-sided printers, and send the distribution map to the advertisement publishing terminal;

the advertisement publishing terminal is configured to display the distribution map of the double-sided printers, and after obtaining advertisement content input by a user and an advertisement publishing scope selected by the user on the distribution map, generate advertisement information and send the advertisement information to the cloud advertisement server;

the cloud advertisement server is further configured to parse, after receiving the advertisement information sent by the advertisement publishing terminal, the advertisement information to obtain the corresponding advertisement publishing scope and advertisement content, generate corresponding advertisement push information based on the advertisement content, and send the advertisement push information to double-sided printers in the advertisement publishing scope; and each double-sided printer is configured to receive the advertisement push information and print the corresponding advertisement information on the back of cash register paper when printing cash register information.

Further, preferably, the plurality of double-sided printers are divided into a plurality of specified categories in advance, and the step of obtaining an advertisement publishing scope selected by the user on the distribution map further includes selecting double-sided printers of a specified category input by the user based on the corresponding category.

Further, preferably, the specified categories refer to a plurality of categories obtained by obtaining historical printed data of a plurality of double-sided printers within a period of time, performing data cleansing, and further performing clustering and grouping based on commodity information in the historical printed data.

The present disclosure further provides an intelligent advertisement publishing method based on a double-sided printer distribution map, including steps of:

generating, through a cloud advertisement server, a distribution map based on geographical location information of double-sided printers, and sending the distribution map to an advertisement publishing terminal;

displaying, through the advertisement publishing terminal, the distribution map of the double-sided printers, and after obtaining advertisement content input by a user and an advertisement publishing scope selected by the user on the distribution map, generating advertisement information and sending the advertisement information to the cloud advertisement server;

after receiving, through the cloud advertisement server, the advertisement information sent by the advertisement publishing terminal, performing parsing to obtain the corresponding advertisement publishing scope and advertisement content, generating corresponding advertisement push information based on the advertisement content, and sending the advertisement push information to double-sided printers in the advertisement publishing scope; and enabling the double-sided printers to receive and parse the advertisement push information, and print the corresponding advertisement information on the back of cash register paper when printing cash registration information.

Further, preferably, the advertisement publishing terminal uses the following method to obtain the advertisement publishing scope selected by the user on the distribution map:

displaying positions of the double-sided printers on the distribution map and dividing the double-sided printers by area, and in response to an area selected by the user, obtaining all double-sided printers in the area as the advertisement publishing scope selected by the user.

Further, preferably, the advertisement publishing terminal uses the following method to obtain the advertisement publishing scope selected by the user on the distribution map:

displaying positions of the double-sided printers on the distribution map and obtaining a specified geographical location selected by the user and a distance range and a quantity of double-sided printers that are input by the user, and then performing a radial search within the corresponding distance range with the selected specified geographical location as a center, to select the corresponding quantity of double-sided printers as the advertisement publishing scope selected by the user.

Further, preferably, the performing a radial search within the corresponding distance range with the selected specified geographical location as a center, to select the corresponding quantity of double-sided printers specifically includes:

taking the selected specified geographical location as the center, gradually increasing a search radius within the corresponding distance range based on a preset search step, performing the radial search from inside out, and sequentially obtaining double-sided printers within a range of the search radius and counting the double-sided printers until the corresponding quantity of double-sided printers are obtained.

Further, preferably, the plurality of double-sided printers are divided into a plurality of specified categories in advance, and the step of obtaining an advertisement publishing scope selected by the user on the distribution map further includes selecting double-sided printers of a specified category input by the user based on the corresponding category.

Further, preferably, the step of generating, through a cloud advertisement server, a distribution map based on geographical location information of double-sided printers specifically includes:

obtaining, through the cloud advertisement server, geographical location information of all double-sided printers, converting the geographical location information of the double-sided printers into corresponding distribution points on the map, and finally obtaining the distribution map of all the double-sided printers; where the distribution points are configured to be capable of displaying, after being clicked, the geographical location information of the corresponding double-sided printers and corresponding merchant information.

The merchant information includes name, address, contact information, brief introduction, images, and the like of a merchant, and may also include information such as user comments on the merchant, so that the user enjoys convenience in learning of information about a merchant that has a double-sided printer installed.

Further, preferably, the step of enabling the double-sided printers to receive and parse the advertisement push information, and print the corresponding advertisement information on the back of cash register paper when printing cash registration information includes:

receiving and parsing, through each double-sided printer, the advertisement push information, and generating advertisement information in a corresponding format based on dimensions of the cash register paper; and printing the corresponding advertisement information on the back of the cash register paper in real time when printing cash register information.

Further, preferably, the step of printing the corresponding advertisement information on the back of the cash register paper in real time when printing cash register information includes:

calculating the dimensions of the cash register paper occupied by the to-be-printed cash register information after obtaining the to-be-printed cash register information;

calculating a quantity of pieces of printable advertisement information based on the calculated dimensions of the cash register paper occupied by the cash register information;

obtaining one or more pieces of corresponding to-be-printed advertisement information with reference to the calculated quantity; and printing the corresponding advertisement information on the back of the cash register paper in real time when printing the cash register information, until the printing is completed.

The present disclosure is described in detail by using more specific embodiments below.

Referring to FIG. 1, an intelligent advertisement publishing system based on a double-sided printer distribution map includes a cloud advertisement server, at least one advertisement publishing terminal, and a plurality of double-sided printers, where the cloud advertisement server is separately and wirelessly connected to the advertisement publishing terminal and the double-sided printers; and the cloud advertisement server is configured to generate a distribution map based on geographical location information of the double-sided printers, and send the distribution map to the advertisement publishing terminal; the advertisement publishing terminal is configured to display the distribution map of the double-sided printers, and after obtaining advertisement content input by a user and an advertisement publishing scope selected by the user on the distribution map, generate advertisement information and send the advertisement information to the cloud advertisement server; the cloud advertisement server is further configured to parse, after receiving the advertisement information sent by the advertisement publishing terminal, the advertisement information to obtain the corresponding advertisement publishing scope and advertisement content, generate corresponding advertisement push information based on the advertisement content, and send the advertisement push information to double-sided printers in the advertisement publishing scope; and each double-sided printer is configured to receive the advertisement push information and print the corresponding advertisement information on the back of cash register paper when printing cash register information. As shown in FIG. 1, advertisement publishing terminals 1 to n and double-sided printers 1 to m are included, where n is a positive integer greater than or equal to 1, and m is a positive integer greater than or equal to 2.

In this embodiment, the plurality of double-sided printers are divided into a plurality of specified categories in advance, and the step of obtaining an advertisement publishing scope selected by the user on the distribution map further includes selecting double-sided printers of a specified category input by the user based on the corresponding category. Each specified category of a plurality of double-sided printers is provided with a corresponding category code. After the plurality of double-sided printers are divided into a plurality of specified categories in advance, a user can select a specified category of double-sided printers while inputting advertisement content and selecting an advertisement publishing scope on an advertisement publishing terminal, so that double-sided printers of the specified category input by the user are selected based on the corresponding category. As such, targeted advertisement publishing can be implemented, that is, targeted advertisement publishing can further be performed while regional publishing is implemented based on the map, and therefore advertisement information publishing is more targeted and more effective.

The specified categories may be divided based on distribution areas, industry information, or printed commodity information of the plurality of double-sided printers. For example, simple division is performed based on different communities, different streets, merchants of different brands, merchants in different industries, or merchants selling different types of products.

Preferably, in this embodiment, the specified categories refer to a plurality of categories obtained by obtaining historical printed data of a plurality of double-sided printers within a period of time, performing data cleansing, and further performing clustering and grouping based on commodity information in the historical printed data.

The step of performing data cleansing includes exception data processing, and deletion processing of small-probability data. The exception data processing refers to removal of data that apparently does not belong to commodity information. The deletion processing of small-probability data refers to deletion of commodity data with an occurrence quantity less than a preset proportion threshold in historical printing data, so that commodities that rarely appear can be removed during categorization performed based on the commodity information, thereby reducing generation of invalid categories.

The advertisement publishing terminal may be a specially configured computer, or only a mobile phone with corresponding permissions, or only an APP having an advertisement information publishing function. In the present disclosure, the advertisement publishing terminal mainly functions as an information publishing interface. When a user publishes advertisement information, the information can be sent to the advertisement publishing terminal through various intelligent terminals, so that an operator of the advertisement publishing terminal edits the advertisement information and sends the same to the cloud advertisement server.

The system can select a corresponding advertisement publishing scope on a distribution map and send to-be-sent advertisement information in time to double-sided printers inside the scope selected by the user for printing, provided that the double-sided printers are configured in charging terminals in advance, such as a convenience store, a shop, and a supermarket, and that wireless communication is established between the double-sided printers and the cloud advertisement server. As such, various types of advertisement information can be printed with no need to consume a large quantity of manpower and material resources in advance for printing, and the advertisement information can be updated or published at any time. The system is high in timeliness, and can meet the requirements for advertisement information pushing. Moreover, this method is more environmentally friendly and requires no additional material consumption. In addition, targeted advertisement information publishing can also be implemented by using the method. For example, when advertisement information aiming at a certain community needs to be printed on cash register paper of various cash register terminals of the community, only a specified category of double-sided printers needs to be input through the advertisement publishing terminal.

Figure 2:
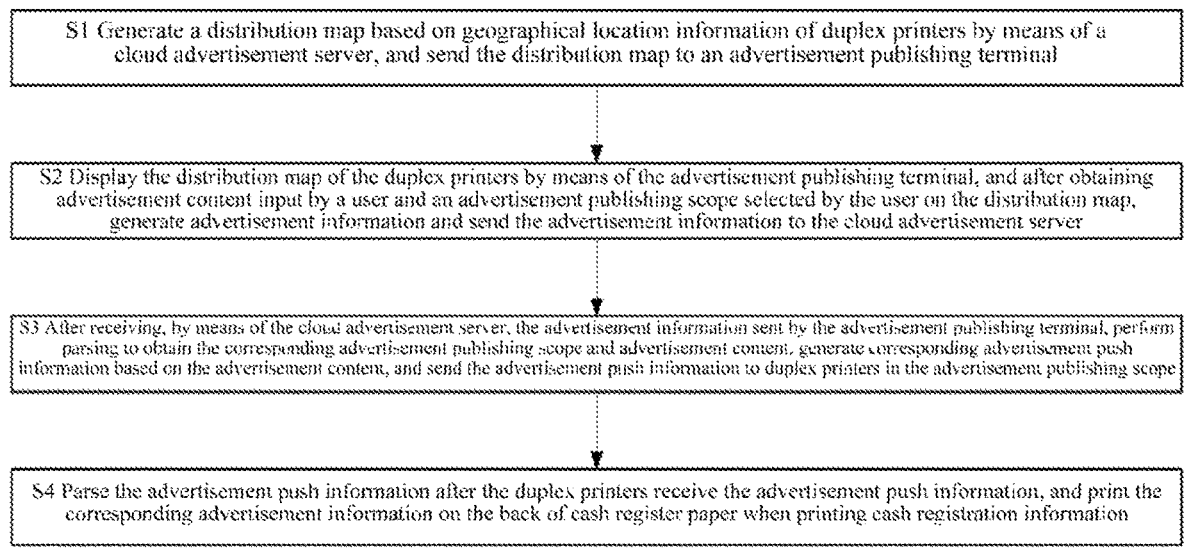
FIG. 2 shows a flowchart of a specific embodiment of a method for advertising through the back of cash register paper according to the present disclosure.

Correspondingly, the advertising method based on this embodiment is as follows:

Referring to FIG. 2, an intelligent advertisement publishing method based on a double-sided printer distribution map includes the following steps.

S1: Generate a distribution map based on geographical location information of double-sided printers by means of a cloud advertisement server, and send the distribution map to an advertisement publishing terminal, specifically including: obtaining, through the cloud advertisement server, geographical location information of all double-sided printers, converting the geographical location information of the double-sided printers into corresponding distribution points on the map, and finally obtaining the distribution map of all the double-sided printers; where the distribution points are configured to be capable of displaying, after being clicked, the geographical location information of the corresponding double-sided printers and corresponding merchant information. The merchant information includes name, address, contact information, brief introduction, images, and the like of a merchant, and may also include information such as user comments on the merchant, so that the user enjoys convenience in learning of information about a merchant that has a double-sided printer installed.

S2: Display the distribution map of the double-sided printers by means of the advertisement publishing terminal, and after obtaining advertisement content input by a user and an advertisement publishing scope selected by the user on the distribution map, generate advertisement information and send the advertisement information to the cloud advertisement server.

S3: After receiving, by means of the cloud advertisement server, the advertisement information sent by the advertisement publishing terminal, perform parsing to obtain the corresponding advertisement publishing scope and advertisement content, generate corresponding advertisement push information based on the advertisement content, and send the advertisement push information to double-sided printers in the advertisement publishing scope.

S4: Parse the advertisement push information after the double-sided printers receive the advertisement push information, and print the corresponding advertisement information on the back of cash register paper when printing cash registration information.

In step S2, the advertisement publishing terminal obtains the advertisement publishing scope selected by the user on the distribution map in the following two methods:

First method: displaying positions of the double-sided printers on the distribution map and dividing the double-sided printers by area, and in response to an area selected by the user, obtaining all double-sided printers in the area as the advertisement publishing scope selected by the user.

Second method: displaying positions of the double-sided printers on the distribution map and obtaining a specified geographical location selected by the user and a distance range and a quantity of double-sided printers that are input by the user, and then performing a radial search within the corresponding distance range with the selected specified geographical location as a center, to select the corresponding quantity of double-sided printers as the advertisement publishing scope selected by the user.

In the second method, the performing a radial search within the corresponding distance range with the selected specified geographical location as a center, to select the corresponding quantity of double-sided printers specifically includes:

taking the selected specified geographical location as the center, gradually increasing a search radius within the corresponding distance range based on a preset search step, performing the radial search from inside out, and sequentially obtaining double-sided printers within a range of the search radius and counting the double-sided printers until the corresponding quantity of double-sided printers are obtained. For example, if the search step is 1 km, the radial search is performed with 1 km, 2 km, 3 km, . . . , n km as the search radius sequentially until a corresponding number of double-sided printers are found.

In this embodiment, the plurality of double-sided printers are divided into a plurality of specified categories in advance, and the step of obtaining an advertisement publishing scope selected by the user on the distribution map further includes selecting double-sided printers of a specified category input by the user based on the corresponding category. Therefore, in the first method, after the user selects an area, double-sided printers in the area are also filtered, and all double-sided printers in the area in a specified category same as the one input by the user are selected as the advertisement publishing scope selected by the user. In the second method, when the radial search is performed within the corresponding distance range, double-sided printers are also filtered at the same time to select all double-sided printers within a range of the radial search and in a specified category same as the one input by the user.

Specifically, step S4 includes the following:

S41: Receive and parse, through each double-sided printer, the advertisement push information, and generate advertisement information in a corresponding format based on dimensions of the cash register paper.

S42: Print the corresponding advertisement information on the back of the cash register paper in real time when printing the cash register information.

Step S42 specifically includes the following:

S421: Calculate the dimensions of the cash register paper occupied by the to-be-printed cash register information after obtaining the to-be-printed cash register information.

S422: Calculate a quantity of pieces of printable advertisement information based on the calculated dimensions of the cash register paper occupied by the cash register information.

S423: Obtain one or more pieces of corresponding to-be-printed advertisement information with reference to the calculated quantity.

S424: Print the corresponding advertisement information on the back of the cash register paper in real time when printing the cash register information, until the printing is completed.

Therefore, in the present disclosure, a cloud advertisement server, an advertisement publishing terminal, and a plurality of double-sided printers are adopted, and a distribution map is established based on geographical location information of the double-sided printers, so that a corresponding advertisement publishing scope can be obtained by receiving a selection on the distribution map over a communications network, and advertisement content input by a user is obtained at the same time. As such, advertisement information is generated in time based on the advertisement content input by the user and sent in time to the double-sided printer for printing. In this way, various types of advertisement information can be printed with no need to consume a large amount of manpower and material resources in advance for printing, and the advertisement information can be updated or published at any time. Therefore, timeliness is high, and the requirement for advertisement information push can be met.

The preferred embodiments of the present disclosure have been described in detail above, but the present disclosure is not limited to the embodiments. Various equivalent modifications or replacements can be made by those skilled in the art without departing from the spirit of the present disclosure. These equivalent modifications or replacements fall within the scope of the claims of the present application.

What is claimed is:

1. An intelligent advertisement publishing system based on a double-sided printer distribution map, comprising
a cloud advertisement server,
at least one advertisement publishing terminal, and
a plurality of double-sided printers, wherein
the cloud advertisement server is separately and wirelessly connected to the advertisement publishing terminal and the double-sided printers;
the cloud advertisement server is configured to generate a distribution map based on geographical location information of the double-sided printers, and send the distribution map to the advertisement publishing terminal;
the advertisement publishing terminal is configured to display the distribution map of the double-sided printers, and after obtaining advertisement content input by a user and an advertisement publishing scope selected by the user on the distribution map, generate advertisement information and send the advertisement information to the cloud advertisement server;
the cloud advertisement server is further configured to parse, after receiving the advertisement information sent by the advertisement publishing terminal, the advertisement information to obtain the corresponding advertisement publishing scope and advertisement content, generate corresponding advertisement push information based on the advertisement content, and send the advertisement push information to double-sided printers in the advertisement publishing scope; and
each double-sided printer is configured to receive the advertisement push information and print the corresponding advertisement information on the back of cash register paper when printing cash register information.

2. The intelligent advertisement publishing system based on a double-sided printer distribution map according to claim 1, wherein the plurality of double-sided printers are divided into a plurality of specified categories in advance, and wherein obtaining an advertisement publishing scope selected by the user on the distribution map further comprises selecting double-sided printers of a specified category input by the user based on the corresponding category.

3. The intelligent advertisement publishing system based on a double-sided printer distribution map according to claim 2, wherein the specified categories refer to a plurality of categories obtained by obtaining historical printed data of a plurality of double-sided printers within a period of time, performing data cleansing, and further performing clustering and grouping based on commodity information in the historical printed data.

4. An intelligent advertisement publishing method based on a double-sided printer distribution map, comprising:
generating, through a cloud advertisement server, a distribution map based on geographical location information of double-sided printers, and sending the distribution map to an advertisement publishing terminal;
displaying, through the advertisement publishing terminal, the distribution map of the double-sided printers, and after obtaining advertisement content input by a user and an advertisement publishing scope selected by the user on the distribution map, generating advertisement information and sending the advertisement information to the cloud advertisement server;
after receiving, through the cloud advertisement server, the advertisement information sent by the advertisement publishing terminal, performing parsing to obtain the corresponding advertisement publishing scope and advertisement content, generating corresponding advertisement push information based on the advertisement content, and sending the advertisement push information to double-sided printers in the advertisement publishing scope; and
enabling the double-sided printers to receive and parse the advertisement push information, and print the corresponding advertisement information on the back of cash register paper when printing cash registration information.

5. The intelligent advertisement publishing method based on a double-sided printer distribution map according to claim 4, wherein the advertisement publishing terminal uses the following method to obtain the advertisement publishing scope selected by the user on the distribution map:
displaying positions of the double-sided printers on the distribution map and dividing the double-sided printers by area, and in response to an area selected by the user, obtaining all double-sided printers in the area as the advertisement publishing scope selected by the user.

6. The intelligent advertisement publishing method based on a double-sided printer distribution map according to claim 5, wherein the plurality of double-sided printers are divided into a plurality of specified categories in advance, and the step of obtaining an advertisement publishing scope selected by the user on the distribution map further comprises selecting double-sided printers of a specified category input by the user based on the corresponding category.

7. The intelligent advertisement publishing method based on a double-sided printer distribution map according to claim 4, wherein the advertisement publishing terminal uses the following method to obtain the advertisement publishing scope selected by the user on the distribution map:
displaying positions of the double-sided printers on the distribution map and obtaining a specified geographical location selected by the user and a distance range and a quantity of double-sided printers that are input by the user, and then performing a radial search within the corresponding distance range with the selected specified geographical location as a center, to select the corresponding quantity of double-sided printers as the advertisement publishing scope selected by the user.

8. The intelligent advertisement publishing method based on a double-sided printer distribution map according to claim 7, wherein the step of performing a radial search within the corresponding distance range with the selected specified geographical location as a center, to select the corresponding quantity of double-sided printers comprises:
taking the selected specified geographical location as the center, gradually increasing a search radius within the corresponding distance range based on a preset search step, performing the radial search from inside out, and sequentially obtaining double-sided printers within a range of the search radius and counting the double-sided printers until the corresponding quantity of double-sided printers are obtained.

9. The intelligent advertisement publishing method based on a double-sided printer distribution map according to claim 4, wherein the step of generating, through a cloud advertisement server, a distribution map based on geographical location information of double-sided printers comprises:
obtaining, through the cloud advertisement server, geographical location information of all double-sided printers, converting the geographical location information of the double-sided printers into corresponding distribution points on the map, and finally obtaining the distribution map of all the double-sided printers; wherein
the distribution points are configured to be capable of displaying, after being clicked, the geographical location information of the corresponding double-sided printers and corresponding merchant information.

10. The intelligent advertisement publishing method based on a double-sided printer distribution map according to claim 4, wherein the step of enabling the double-sided printers to receive and parse the advertisement push information, and print the corresponding advertisement information on the back of cash register paper when printing cash registration information comprises:
receiving and parsing, through each double-sided printer, the advertisement push information, and generating advertisement information in a corresponding format based on dimensions of the cash register paper; and
printing the corresponding advertisement information on the back of the cash register paper in real time when printing cash register information.

\* \* \* \* \*